United States Patent [19]

Siegel

[11] 4,091,402
[45] May 23, 1978

[54] CAMERA SUPPORT BRACKET AND FLASH UNIT MOUNTING DEVICE

[76] Inventor: Philip Siegel, 7244 W. Touhy Ave., Chicago, Ill. 60648

[21] Appl. No.: 752,459

[22] Filed: Dec. 20, 1976

[51] Int. Cl.² ............................................. G03B 17/56
[52] U.S. Cl. ...................................... 354/293; 354/82; 362/3
[58] Field of Search .................. 354/293, 290, 81, 82; 240/1.3; 352/243

[56] References Cited

U.S. PATENT DOCUMENTS

| | | | |
|---|---|---|---|
| 3,074,338 | 1/1963 | Hanscom | 354/293 X |
| 3,731,897 | 5/1973 | Price | 354/293 X |
| 3,855,602 | 12/1974 | Hoos | 354/293 |
| 3,893,145 | 7/1975 | King | 354/293 |
| 3,984,855 | 10/1976 | Baczynsky | 354/293 |
| 3,999,055 | 12/1976 | Wakahara | 354/293 X |
| 4,027,318 | 5/1977 | Knapp | 354/293 |

*Primary Examiner*—L. T. Hix
*Assistant Examiner*—Alan Mathews
*Attorney, Agent, or Firm*—Silverman, Cass & Singer Ltd.

[57] ABSTRACT

A universal camera support or mounting bracket is pivotally secured to a flash unit mounting device to provide the proper lighting conditions for a wide variety of cameras. The universal camera support bracket has a friction surfaced generally rectangular plate with a generally H-shaped through slot in the plate. A thumb screw is slidably secured in the slot. The flash unit mounting device has an integral handle formed at the bottom of a unitary standard with a bracket support integral with the handle and extending from the bottom of the handle pivotally connected to the camera support bracket. The standard includes a rod extending upwardly from the handle. The rod has a second bracket support formed integral with the top end of the rod and laterally extending therefrom. An extension rod is slidably adjustable within on internal passageway of the first rod and includes a third bracket support at the top end of the extension rod. A flash unit mounting bracket may be pivotally secured to the second or third bracket support.

10 Claims, 6 Drawing Figures

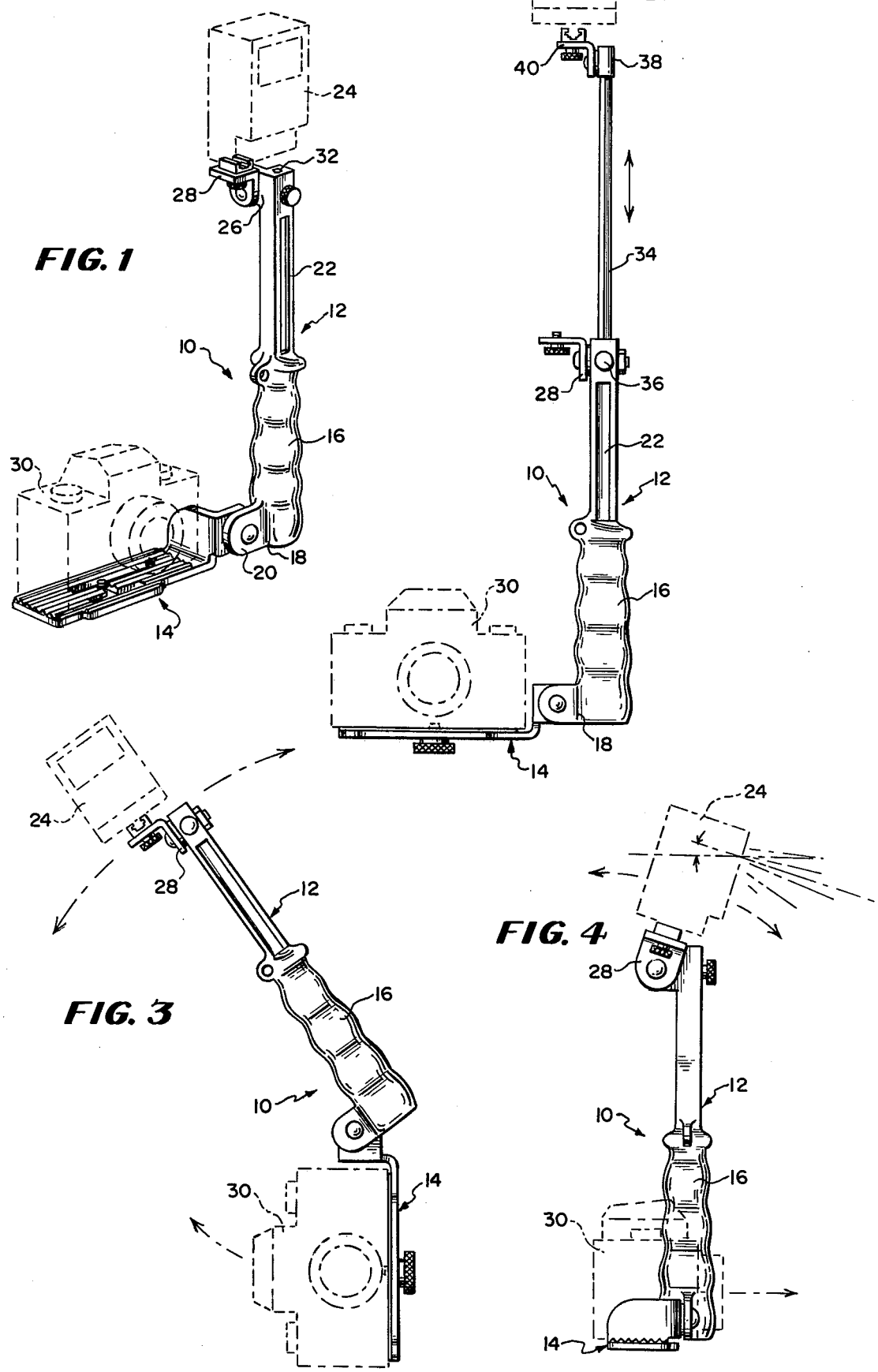

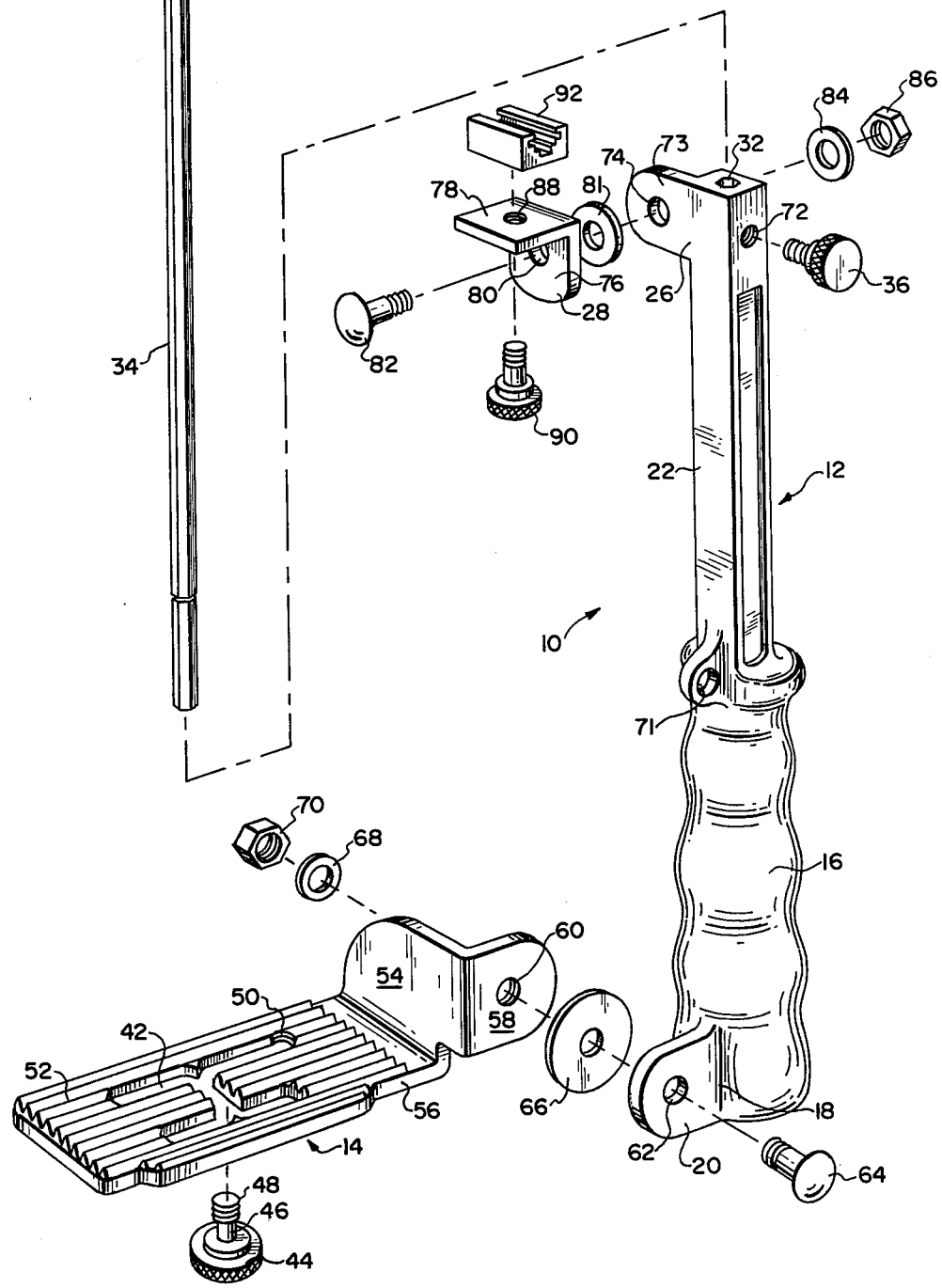

CAMERA SUPPORT BRACKET AND FLASH UNIT MOUNTING DEVICE

BACKGROUND OF THE INVENTION

The invention relates to a flash unit mounting device for a camera and more particularly to an adjustable flash unit mounting device including a universal camera support bracket which easily mounts any of a wide variety of cameras of both the 35mm and 2¼ by 2¼ types.

Current interest in photography has brought about a need for more efficient camera and flash unit mounting devices to provide shadowless, balanced and three-dimension lighting and also bounce lighting and to eliminate the red eye effect of individuals. The many types and sizes of cameras now available present considerable problems in developing a camera and flash unit mounting device which will accommodate any of such different cameras. A unit most desirable should accommodate most, if not all, of the cameras now on the market, without complicated and heavy mechanisms.

One support intended to solve this need is illustrated in U.S. Pat. No. 3,289,563 to Kent. The combination illustrated in this patent presents several problems including a large number of pieces, difficulty in balancing the cameras utilized, and the limited ability to accept varying types and sizes of cameras and also the varying types and sizes of flash units.

SUMMARY OF THE INVENTION

The above and other disadvantages of prior art camera and flash unit supports are overcome in accordance with the present invention by providing a lightweight uncomplicated and easily adjustable camera and flash unit mounting device which has a minimum number of elements. The mounting device comprises a unitary standard having an integral handle formed on the lower end thereof with a first bracket support integral with the handle and extending from the bottom of the handle. The standard has a rod extending upwardly from the handle with an internal passageway opening at the top of the handle. The top of the rod is provided with a second bracket support which extends laterally therefrom substantially perpendicular to the bottom first bracket support. An extension rod is slidably and adjustably disposed within the internal passageway and has a third bracket support attached to the top of the extension rod and extending laterally substantially parallel to the second bracket support. A universal camera support or mounting bracket is pivotally attached at one end to the first bracket support and has a friction surfaced generally rectangular plate disposed substantially perpendicular to the pivot plane of the first bracket support. The plate has a H-shaped through slot with a thumb screw slidable in the slot to secure the camera to the plate. A flash unit mounting bracket is adjustable in a plane substantially perpendicular to the plane of the adjustment of the camera support bracket and may be secured to either the second or third bracket support depending on the distance desired to concentrate the illumination. The camera and flash unit mounting brackets are frictionally engaged to allow adjusting by an external force, but will not freely pivot.

BRIEF DESCRIPTION OF THE DRAWING

FIG. 1 is a perspective view of the camera and flash unit mounting device with a camera and flash unit shown in phantom mounted on the device;

FIG. 2 is a front view of the mounting device similar to FIG. 1 with the flash unit mounted on an extendable extension rod;

FIG. 3 is a front view of the mounting device illustrating the pivot plane of the flash unit standard and camera bracket;

FIG. 4 is a side view of the mounting unit illustrating the pivot plane of the flash unit mounting bracket;

FIG. 5 is an exploded perspective view of the mounting device; and

FIG. 6 is a top view of the universal camera bracket of the mounting device.

DESCRIPTION OF THE PREFERRED EMBODIMENT

As indicated above, the invention is concerned with a mounting device for a camera and flash unit which is easily adjustable to eliminate shadows and which will accommodate most cameras. Notwithstanding the minimal numbers of parts the mounting device is easily adjustable to a multiple number of positions to provide substantially shadowless and balanced lighting. The handle of the mounting device is located in relation to the camera mass to provide better balance when holding the camera and flash unit.

Referring now to FIG. 1, the camera and flash unit mounting device of the invention is designated generally 10. The mounting device consists of two major elements, a unitary flash unit mounting standard 12 and a universal camera support or mounting bracket 14.

The flash unit mounting standard 12 comprises an integral handle 16 formed on the bottom thereof with a first bracket support 18 integrally formed at the bottom of the handle. The bracket support 18 is shown extending laterally with a lateral extension 20, but the bracket support 18 may be formed directly below the bottom of the handle without the lateral extension 20. The support 18 formed below the handle is inexpensive and sturdy. The lateral extension 20 allows a greater angle of pivoting between the mounting standard 12 and the camera bracket 14 and allows the bracket 14 to be folded more compactly with the mounting standard 12 when the mounting device 10 is not being utilized.

A rod 22 extends upward from the handle 16 to support a flash unit 24 shown in phantom lines. The rod 22 has a second bracket support 26 at the top thereof which extends laterally in a direction substantially perpendicular to the extension 20 of the first bracket support to mount a first flash unit mounting bracket 28. The second bracket support 26 and the flash unit mounting bracket 28 allow the flash unit 24 to be moved in a plane substantially perpendicular to the plane of movement allowed by the lateral extension 20.

A camera 30 is illustrated in phantom mounted on the camera mounting bracket 14. The camera bracket 14 is pivotally mounted to the first bracket support 18 to allow the flash unit 24 to be moved in a plane perpendicular to the lens axis of the camera.

The standard 12 has an internal passageway (not shown) which extends through the top of the rod 22 at an opening 32. When it is desired to extend the flash unit 24, above the top of the mounting standard 12, an extension rod 34 (FIG. 2) is inserted into the passageway through the opening 32.

The extension rod 34 is slidably adjustable in the mounting standard 12 from an extended position as shown in FIG. 2 to a position just above the top of the rod 22. A thumb screw 36 is mounted in the top of the rod 22 and is loosened to allow the extension rod 34 to be moved and tightened to secure the extension rod 34 in any desired position.

The extension rod 34 has a third bracket support 38 attached to the top of the extension rod 34. A second flash unit mounting bracket 40 is pivotally secured to the third bracket support 38 to again mount the flash unit 24.

FIG. 3 illustrates most clearly the first plane of movement defined by the mounting standard 12 and the camera bracket 14, which allows the flash unit 24 to be moved from a position directly over the camera 30 laterally to a position to the side of the camera 30. The handle 16 above the pivot point at the bottom of the standard 12 allows the device 10 to be balanced with a minimum of effort. The camera mass is below the holding point of the thick handle 16, the thickness allowing the handle to easily be grasped.

FIG. 4 illustrates the second plane of movement of the flash unit 24 which is substantially perpendicular to the plane of movement defined by the mounting standard 12 and camera bracket 14. This allows the flash unit 24 to be tilted downward so that it is directed toward the object to be photographed, or to be tilted backwards for bounce lighting of the subject to be photographed. The device 10 is generally utilized to eliminate shadows and balance lighting, but may also be adjusted to produce a specific desired shadow effect.

Once the camera 30 is mounted on the camera bracket 14 the flash unit 24 may be moved to the proper angle by pivoting the mounting standard 12 and then the flash unit 24 may be directed in the proper direction by pivoting the flash unit on the flash unit mounting bracket 28 or the second flash unit mounting bracket 40. The distance between the flash unit 24 and the camera 30 may be extended by utilizing the extension rod 34 which may be adjusted to the proper height as desired.

The details of the mounting device 10 may be most clearly seen in FIG. 5. The camera bracket 14 has an H-shaped through slot 42 with a thumb screw 44 slidable in the slot. Virtually all cameras have a bottom opening threaded socket located somewhere in the bottom surface of the camera. The location of the bottom threaded socket varies from camera to camera, but each typically has the same threaded diameter opening. THe thumb screw 44 has a shank portion 46 which allows the thumb screw to be moved anywhere in the slot 42 to accommodate the various different cameras. The end of the thumb screw 44 has a threaded portion 48 which is a matching threaded stud for the camera threaded socket. The slot 42 has a threaded portion 50, in at least one location, to allow the thumb screw 44 to be screwed into and out of the slot or to allow the bracket 14 to be secured to a tripod or other camera system. Once the thumb screw 44 has been screwed through the threaded portion 50 it will freely slide in the slot 42 because of the smaller diameter shank portion 46. The threaded portion 50 may of course be located anywhere in the slot 42 as desired.

The top surface of the camera bracket 14 has a friction type covering 52 which may be an elastomeric material and may be a ridged surface or a surface molded with or otherwise manufactured with the bracket 14 by any convenient method. The camera 30 will be kept from moving from its secured position with the thumb screw 44 by the friction covering 52 when the thumb screw is threaded into the bottom opening of the camera and tightened.

One end of the camera bracket 14 is provided with an L-shaped flange 54 which is substantially perpendicular to a baseplate 56 of the bracket 14. The flange 54 has a pivot flange 58 formed at one edge thereof, substantially perpendicular to the surface of the flange 54 and parallel to the longer dimension of the rectangular baseplate 56. The pivot flange 58 has a hole 60 therethrough which aligns with a hole 62 in the lateral extension 20 of the bracket support 18. A bolt or other securement means 64 is inserted through the hole 62, washer 66, hole 60 and is secured by a second washer 68 and a nut 70. The tension applied to the nut 70 and bolt 64 is just sufficient to allow the bracket 14 and the mounting standard 12 to be easily pivoted to any desired position, but only with applied force.

The handle 16 is preferably molded when forming the mounting standard 12. The mounting standard 12 and the camera bracket 14 may be formed from any convenient material, but would preferably be molded or otherwise formed from a plastic-like polymer to provide durability without adding weight to the mounting device 10. The extension rod 34 preferably would be formed from lightweight aluminum. The device may have a passageway 71 for a push button or cable release accessory for the camera and flash unit.

The second bracket support 26 which would be molded to the top of the rod 22 has a threaded passageway 72 which accommodates the thumb screw 36 and which intercepts the internal passageway (not shown) extending laterally into the mounting standard 12 so that the thumb screw 36 may be tightened against the extension rod 34 to hold the rod firmly in position. The internal passageway preferably is molded in a hexagonal or other non-circular cross sectional configuration as seen by the opening 32 and the extension rod 34 to maintain the alignment between the mounting standard 12 and the extension rod 34.

The second bracket support 26 also has a lateral extension 73 which extends to the front or rear of the mounting standard 12 substantially perpendicular to the lateral extension 20. The lateral extension 73 is provided with a hole 74. The flash unit mounting bracket 28 is an L-shaped bracket having a first flange 76 and a second perpendicular flange 78. The first flange 76 has a hole 80 aligning with washer 81 and the hole 74 through which a bolt or other fastening device 82 is inserted and secured by a washer 84 and nut 86. Again, the bolt 82 and the nut 86 are tensioned just sufficient so the flash unit mounting bracket 28 may be manually pivoted, but will not freely swing without an external force applied to it.

The second flange 78 of the flash unit mounting bracket 28 has a hole 88 which has a thumb screw 90 threaded through it. The thumb screw 90 is inserted directly into the bottom of the flash unit 24 if it is provided with a bottom threaded socket, or it may be inserted into an accessory shoe 92 into which the flash unit 24 may be secured.

The extension rod 34 and the third bracket support 38 are illustrated as being separate pieces; however, they may most conveniently be formed as a unitary part. The extension rod 34 may be of any desired length. The third bracket support 38 has an extension 94 which extends laterally from it substantially parallel to the lateral extension 73 of the second bracket support 26. The extension 94 has a hole 96 which is aligned with a hole 98 provided in a first flange 100 of the L-shaped second flash unit mounting bracket 40. Again, a bolt 102 is inserted through the hole 98, washer 103 and the hole 96 and secured by a washer 104 and a nut 106. The bolt 102 and nut 106 are tensioned so that the second flash unit mounting bracket 40 may also be manually pivoted.

The mounting bracket 40 has a second flange 108 which is provided with a threaded hole 110 identical to the threaded hole 88. When the extension rod is desired to be utilized it is inserted into the opening 32 and the thumb screw 90 is removed from the bracket 28 and inserted through the hole 110 to secure the flash unit 24 on top of the mounting bracket 40. The bracket 40 may also be provided with an accessory shoe identical to the accessory shoe 92 or the same accessory shoe may be utilized for both brackets. A second thumb screw identical to the thumb screw 90 may also be utilized with the bracket 40 rather than removing the thumb screw 90 from the bracket 28.

The universal camera mounting bracket 14 is most clearly seen in FIG. 6. The H-shaped slot 42 has a rear arm 112 and a front arm 114 joined by crossbar 116. The threaded portion 50 is provided in one end of the rear arm 112. The threaded portion as previously mentioned could be in another location but the location as illustrated is best utilized for balancing the device 10 on a tripod stand. The thumb screw 44 will not accidentally fall from the H-shaped slot 42 as the threaded portion 48 of the thumb screw is slightly larger than the width of the arms 112, 114 and the crossbar 116 of the H-shaped slot 42. Two nibs 115 and 117 are provided in the arms 112 and 114 opposite the ends of the crossbar 116 to prevent the screw 44 from falling from the slot 42 at the intersections of the crossbar and the arms.

A front edge 118 of the baseplate 56 is provided with a cutout 120, which aligns with the front edge of 35mm cameras while the camera is firmly mounted on the baseplate 56. The rewind button of most cameras is typically on the bottom right front portion of the camera. The baseplate 56 is dimensioned such that the button may be accessed as the cameras extend beyond an outer edge 122. This button is also utilized to provide a double exposure when desired.

The pivot flange 58 has been discussed attached only to the mounting standard 12; however, it may be attached to other camera systems or mounting accessories in a like fashion.

The dimensions of the universal mounting bracket 14 to allow the mounting of approximately 95% of the 35mm and 2¼ by 2¼ camera types in the market place are:

5⅛ inches in length from flange 54 to edge 122
1⅞ inches in width from back to front edge 118
1⅝ inches in width from back to cutout 120
3⅜ inches length of slot arm 112
1¾ inches length of slot arm 114
½ inch length of slot crossbar 116.

Generally the smaller cameras fit in the slot arm 112, the larger cameras fit in the slot arm 114, while some will fit in the slot crossbar 116.

Modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A camera and flash unit mounting device comprising:

A. a unitary elongated standard having,
 1. an integral handle formed on the lower end of said standard,
 2. a first bracket support integral with said handle and extending therefrom at the bottom of said handle,
 3. a rod integral with and extending upwardly from said handle,
 4. a second bracket support integral with the rod and laterally extending therefrom at the top of said rod;
B. a camera mounting bracket having a substantially planar mounting surface adjustable along a plane substantially parallel to said elongated standard and removably connected to said first bracket support said mounting surface being substantially perpendicular to said plane; and
C. a flash unit mounting bracket adjustable in a direction at an angle relative to the plane of adjustment of said camera mounting bracket removably connected to said second bracket support.

2. A mounting device as claimed in claim 1 wherein said camera mounting bracket includes:
a friction surfaced plate of a generally rectangular configuration having a connecting coupling adjustably secured to said first bracket support at one of the ends of said plate;
a generally H-shaped through slot in said plate having the arms of the slot arranged substantially parallel to the longer dimension of the plate and the short crossbar portion of the slot arranged transverse of the plate; and
securing means slidable in said H-shaped slot for removably securing said camera to said bracket.

3. A mounting device as claimed in claim 1 wherein said unitary standard includes:
an internal passageway extending at least partially through said rod with an opening at the top of said rod; and
an extension rod disposed within said passageway and slidably adjustable within said passageway, and including a third bracket support integral with said extension rod and laterally extending therefrom at the top of said extension rod substantially parallel to said second bracket support.

4. A mounting device as claimed in claim 3 wherein said camera mounting bracket includes:
a friction surfaced plate of a generally rectangular configuration having a connecting coupling adjustably secured to said first bracket support at one of the ends of said plate;
a generally H-shaped through slot in said plate having the arms of the slot arranged substantially parallel to the longer dimension of the plate and the short crossbar portion of the slot arranged transverse of the plate; and
securing means slidable in said H-shaped slot for removably securing said camera to said bracket.

5. A mounting device as claimed in claim 4 wherein:
said flash unit bracket angle of adjustment is substantially perpendicular to the plane of adjustment of said camera mounting bracket; and
said camera mounting bracket securing means includes threaded means adapted to be threaded into a bottom opening threaded socket in said camera, and said plate includes a threaded portion at least at one location within said slot for removing said securing means from said slot, and said plate includes an alignment cutout portion at one corner of said plate opposite said connecting coupling.

6. A universal camera mounting bracket for securing a wide variety of cameras to a flash gun mounting accessory or other camera attachment to which the camera mounting bracket is attached, the type of camera for which said bracket is secured being the type which has a bottom opening threaded socket whose geometric position relative to the camera bottom surface profile varies between camera types, said bracket comprising:
   A. a friction surfaced plate of generally rectangular configuration having a connecting coupling to be adjustably secured to said accessory at one of the narrow ends of said plate;
   B. a generally H-shaped through slot in the plate having the arms of the slot arranged substantially parallel to the longer dimension of the plate and the short crossbar portion of the slot arranged transverse of said plate; and
   C. securing means slidable in said H-shaped slot for removably securing said cameras to said bracket.

7. A bracket as claimed in claim 6 wherein:
said securing means include a threaded screw adaptable to be threadedly engaged within said camera bottom opening threaded socket to secure said camera to said bracket.

8. A bracket as claimed in claim 7 further including:
at least one threaded portion in said slot mating with said threaded screw,
whereby said threaded screw may be detached from said slot and bracket plate when desired or said bracket may be attached to a tripod.

9. A bracket as claimed in claim 6 further including:
an alignment cutout on one corner of said plate opposite said connecting coupling.

10. A bracket as claimed in claim 6 wherein:
said connecting coupling includes an integral flange upwardly extending from said plate substantially perpendicular to said plate and including a pivot member extending perpendicularly from one edge of said flange substantially parallel to the longer dimension of said plate.

* * * * *